BEST AVAILABLE COPY

J. R. Lattin.
Hoop Skirt.

No 2946 Reissued May 26, 1868

Witnesses.

John H. Shumway a. J. Libbits

Inventor.

John R Lattin

BY HIS ATTORNEY.

John E Earle

United States Patent Office.

E. WOOSTER AND COMPANY, AND F. HULL AND COMPANY, OF BIRMINGHAM, CONNECTICUT, ASSIGNEES OF JOHN R. LATTIN.

*Letters Patent No.* 64,231, *dated April* 30, 1867; *reissue No.* 2,946, *dated May* 26, 1868.

IMPROVEMENT IN SKIRT-HOOPS.

The Schedule referred to in these Letters Patent and making part of the same.

TO ALL WHOM IT MAY CONCERN:

Be it known that JOHN R. LATTIN, of Birmingham, in the county of New Haven, and State of Connecticut, has invented a new Improvement in Skirt-Hoops; and we do hereby declare the following, when taken in connection with the accompanying drawings, and the letters of reference marked thereon, to be a full, clear, and exact description of the same, and which said drawings constitute part of this specification, and represent, in—

Figure 1:
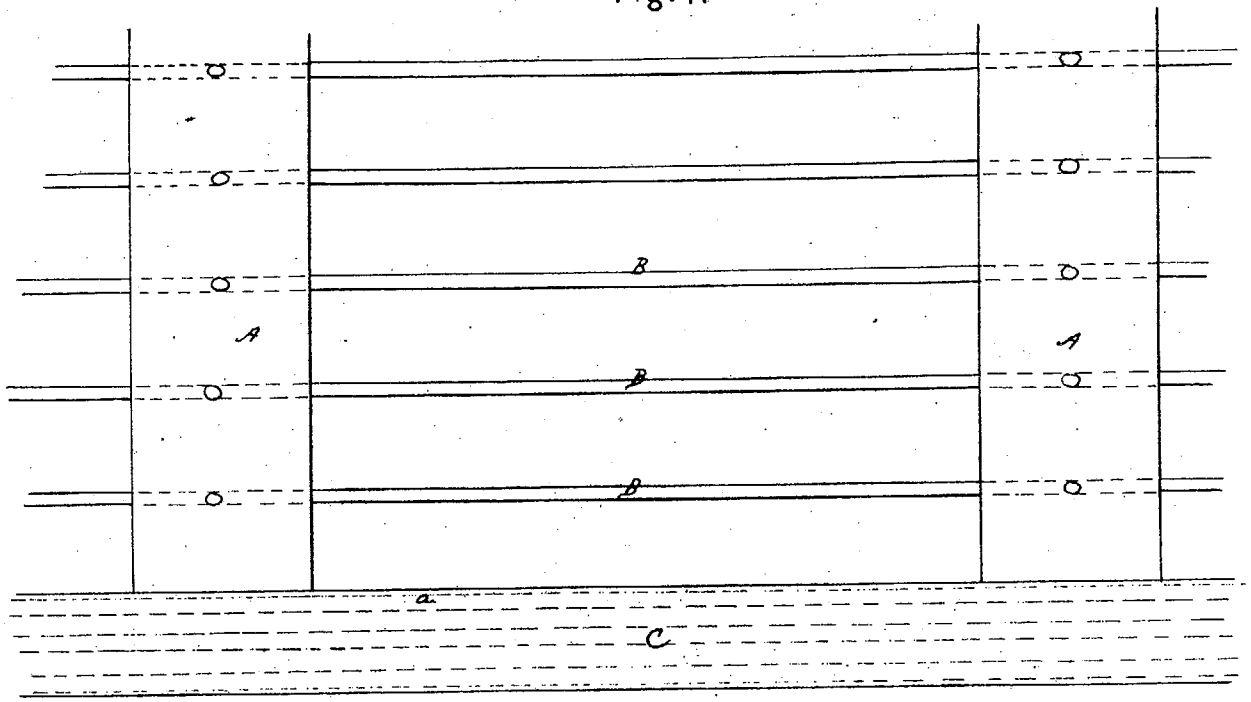
Figure 2:
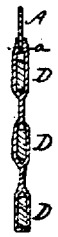

Figure 1, a side view of a portion of a hoop-skirt, showing the improvement, and in Figure 2, a vertical transverse section of the lower hoop.

This invention relates to an improvement in the bottom hoop, and in the manner of its attachment to the tapes, so as to form a finish at the lower end of the tapes, and consists in a tape of double fabric, constructed with two or more longitudinal pockets, and an open edge, so that hoops may be inserted through the pockets, and the tapes inserted into the open edge, and stitched therein, both for the purpose of securing the lower hoop to the tape, and for the protection of the tape.

To enable others to fully understand this improvement, we will describe the same as illustrated in the accompanying drawings.

A A are two of the tapes, and B B the hoops, of common construction. C is the lower hoop, constructed as follows, and as seen in fig. 2. The covering for the lower hoops is woven in a common tape-loom, so as to leave longitudinal pockets D D, (one or more,) and an open upper edge, as denoted in red, fig. 2, or may be made from double fabric, or stitch together, so as to form longitudinal pockets, one or more, and the open edge. The covering thus constructed is cut into proper lengths, and the hoops inserted in the pockets, and their ends secured together in the usual manner. The tapes A are inserted between the open edges of the tape, as denoted in blue, fig. 2, then, in a common sewing-machine, or other equivalent device, the two edges of the covering of the hoop and the several tapes are secured together. In skirts of common construction, that is, where the hoops are single and independent, the lower hoop is liable to catch, and be drawn out of shape, and often broken.

By combining, as is done in the lower hoop, several springs, or a single broad spring, the strength of the hoop is increased, and, in addition to the increase of strength, it is impossible to draw the hoop out of shape, as the covering of the hoops is securely attached to the tapes of the skirt.

We do not wish to be understood as claiming the combination of two or more hoops within a single fabric or covering; neither do we wish to be understood as claiming a bottom, detachable from the skirt, or forming the lower portion of the skirt from a fabric having wires running in long pockets therein.

Having thus fully described this invention, what we claim as the invention of the said JOHN R. LATTIN, and desire to secure by Letters Patent, is—

The bottom hoop for hoop-skirts, formed by combining one or more springs in a single cover, the upper edge of which is formed as described, so as to be secured to the tapes of a skirt, as and for the purpose set forth.

E. WOOSTER & CO.,
F. HULL & CO.

Witnesses:
WM. E. DOWNES,
CHAS. H. COE.